(12) United States Patent
Martin et al.

(10) Patent No.: US 10,050,731 B1
(45) Date of Patent: Aug. 14, 2018

(54) APPARATUS AND METHOD FOR DETECTING A MULTI-HOMED DEVICE USING CLOCK SKEW

(71) Applicant: The United States of America, as represented by the Secretary of the Navy, Washington, DC (US)

(72) Inventors: Bryan J. Martin, Pacific Grove, CA (US); Murali Tummala, Monterey, CA (US); John C. McEachen, Carmel, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 3 days.

(21) Appl. No.: 15/417,307

(22) Filed: Jan. 27, 2017

(51) Int. Cl.
*H04J 3/06* (2006.01)
*H04L 12/741* (2013.01)
*H04L 12/721* (2013.01)

(52) U.S. Cl.
CPC ............ *H04J 3/0661* (2013.01); *H04L 45/72* (2013.01); *H04L 45/745* (2013.01)

(58) Field of Classification Search
CPC ....... H04J 3/0661; H04L 45/72; H04L 45/745
See application file for complete search history.

(56) References Cited

U.S. PATENT DOCUMENTS

| 5,003,256 | A | 3/1991 | Merrill |
| 6,661,810 | B1 | 12/2003 | Skelly et al. |
| 9,378,361 | B1* | 6/2016 | Yen .......................... G06F 21/55 |
| 9,900,312 | B2* | 2/2018 | Mansour ............. H04L 63/0876 |
| 2008/0222445 | A1 | 9/2008 | Liran |
| 2011/0222421 | A1* | 9/2011 | Jana .................... H04L 63/1441 370/252 |

OTHER PUBLICATIONS

Zander et al., "An Improved Clock-skew Measurement Technique for Revealing Hidden Services," 17th USENIX Security Symposium (2008).
Murdoch,"Hot or Not: Revealing Hidden Services by their Clock Skew," Proceedings of CCS 2006 (2006).

(Continued)

*Primary Examiner* — Duc C Ho

(74) *Attorney, Agent, or Firm* — Naval Postgraduate School; James B. Potts; Lisa A. Norris

(57) ABSTRACT

The disclosure provides an apparatus and method for the detection of multi-homed hosts on a computer network utilizing a network comprising a plurality of host computers and a central host. Each host computer has one or more network interfaces and transmits TCP packets over the network to the other hosts and the central host. The central host monitors exchanged traffic and sorts received time-stamped TCP packets by source address, and utilizes the sorted packets to determine a clock skew associated with each source address. Generally the host computer conducts this process over multiple iterations and provides a representative clock skew, with the representative clock skew typically bounded by a confidence interval determined through probability distribution fitting. The apparatus and method compares the representative clock skews to determine similarity and identify potentially multi-homed hosts.

18 Claims, 11 Drawing Sheets

(56) References Cited

OTHER PUBLICATIONS

Polcak et al, "On Reliability of Clock-skew-based Remote Computer Identification," Security and Cryptography (SECRYPT), 2014 11th International Conference on (2014).
Kohno et al, "Remote physical device fingerprinting," IEEE Transactions on Dependable and Secure Computing, vol. 2, pp. 93-108 (2005).
Moon et al, "Estimation and Removal of Clock Skew from Network Delay Measurements," INFOCOM '99. Eighteenth Annual Joint Conference of the IEEE Computer and Communications Societies. Proceedings. IEEE (1999).
Polcak et al., "Comment on Remote Physical Device Fingerprinting," IEEE Transactions on Dependable and Secure Computing, vol. 11, pp. 494-496 (2014).
Wicherski et al., "IP agnostic real-time traffic filtering and host identification using TCP timestamps," IEEE 38th Conference on Local Computer Networks, pp. 647-654 (2013).
Jianping et al., "Dual-homing protection in IP-over-WDM networks," Journal of Lightwave Technology, vol. 23, pp. 3111-3124 (2005).
Lanze et al., "Clock skew based remote device fingerprinting demystified," IEEE Global Communications Conference, pp. 813-819 (2012).
Sharma et al., "An empirical study of clock skew behavior in modern mobile and hand-held devices," in Third International Conference on Communication Systems and Networks, pp. 1-4 (2011).

\* cited by examiner

APPARATUS AND METHOD FOR DETECTING A MULTI-HOMED DEVICE USING CLOCK SKEW

FIELD OF THE INVENTION

One or more embodiments relates to an apparatus and method for the detection of a multi-homed host on a computer network.

BACKGROUND

Network security remains a major concern for all communications systems. With the advent of panoptic, or comprehensive, network management techniques such as software-defined networking (SDN), the ability of a system administrator to leverage the monitoring functions of a panoptic controller have led to the development of a large range of applications for network control and security to include monitoring applications for maintaining the security and integrity of one's network.

A variety of security and cyber related concerns exist for any network. Before an attack can be conducted on a network, an attacker must first gain access. One method to prevent this is the use of a firewall between a private network and the Internet. However, a potential security flaw in a network is the existence of a multi-homed host. A multi-homed host is one that has multiple connections to a network or networks. This can be accomplished by having multiple network interface cards (NICs) installed in the same host, which provides a host with multiple MAC and IP addresses. Multi-homed hosts may be used in a network for redundancy purposes, for example to increase the reliability of a network's access. Access node failure can also be mitigated, and the connectivity from an Internet service provider (ISP) can be made more reliable by having separate connections to separate ISPs.

The threat from a multi-homed host comes from the fact that a multi-homed host can be used to bypass the firewall between an internal network and the Internet. Certain operating systems are not intended to isolate two interfaces within a host and often integrate traffic from one to the other. If a host is multi-homed, this allows for the opportunity to bypass the firewall and provide access to a closed network. Once access to a host on a closed network is gained, potential threats can map a network and begin an exploitation process or infect the network with malicious code. An example of such a network configuration is depicted in FIG. 1 as network 150, comprising controller 151 in data communication with hosts 152 and 153 via 154 and in communication with ISP 158 via 155 passing through firewall 157. At FIG. 1, host 153 is multi-homed, having an additional network interface communicating with ISP 158 via 156 in a manner bypassing firewall 157. Host 153 thereby potentially serves as an access vector to a network 150 which avoids the scrutiny of firewall 157. It would be advantageous to provide an apparatus and method for detection of multi-homed hosts such as host 153 based on an available unique identifier of the host.

As is understood, networked devices all have internal electric clocks that are built from both hardware and software components and control all timing functions for the device. Within these electronic clocks, crystal oscillators are used to determine the clock signal and the rate at which the clock ticks. These crystal oscillators each operate at different, unique frequencies due to the crystal type, the manufacturing parameters, and the small imperfections that are inherent to all manufacturing procedures. Due to these factors, clocks within a device operate at slightly different frequencies independent of clock type or manufacturing series. This makes the system clock within a device a unique characteristic that can be exploited to identify that device. In particular, through analysis of TCP timestamps, a clock skew may be calculated, where the clock skew reflects the difference in the operating frequencies of a given system clock relative to the clock frequency of another device. This parameter can be used to identify the device based solely through passively observing network traffic. It would be advantageous to provide an apparatus and method which exploits such clock skew identification among computers comprising a computer network in order to detect multi-homed hosts participating in the network, in order to identify potential hosts which might present threat access to the network.

These and other objects, aspects, and advantages of the present disclosure will become better understood with reference to the accompanying description and claims.

SUMMARY

The disclosure provides an apparatus and method for the detection of multi-homed hosts on a computer network. The apparatus and method utilizes a network comprising a plurality of host computers and a central host, where each host computer has one or more network interfaces and transmits TCP packets over the network to generally the other hosts and the central host. The central host monitors exchanged traffic, sorts received timestamped TCP packets by source address, and utilizes the sorted packets to determine a clock skew associated with each source address. Typically, the host computer conducts this process over multiple iterations in order to determine a plurality of clock skews for each source address and then determines a representative clock skew for the source address using a statistical analysis of the plurality. Each resulting representative clock skew is then typically bounded by a confidence interval determined through probability distribution fitting, and the representative clock skews are compared in order to determine possible similarity and identify potentially multi-homed hosts.

The novel apparatus and principles of operation are further discussed in the following description.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide an apparatus and method for the detection of a multi-homed host on a computer network.

The apparatus and method operates to monitor and collect traffic across the network comprising host computers, with the traffic of interest as the TCP segments exchanged between hosts and containing TCP timestamps. From this information, the clock skew of each host relative to a central host (the fingerprinter) is determined. After the clock skews of each host on the network are determined, analysis is typically conducted based on hypothesis testing using confidence intervals to identify potential multi-homed hosts.

The apparatus and method utilizes a network comprising a plurality of host computers and a central host. Each host computer has one or more network interfaces and transmits TCP packets over the network to generally the other hosts and the central host. The central host may be a computing device, a controller, of some other programmable processor, and at least receives TCP packets from the plurality of host computers. The central host monitors exchanged traffic and sorts received timestamped TCP packets by source address, and utilizes the sorted packets to determine a clock skew associated with each source address. Typically, the host computer conducts this process over multiple iterations in order to determine a plurality of clock skews for each source address, then determines a representative clock skew for the source address using a statistical analysis of the plurality. Each resulting representative clock skew is then typically bounded by a confidence interval determined through probability distribution fitting, and the representative clock skews are compared in order to determine possible similarity and identify potentially multi-homed hosts.

Figure 2:
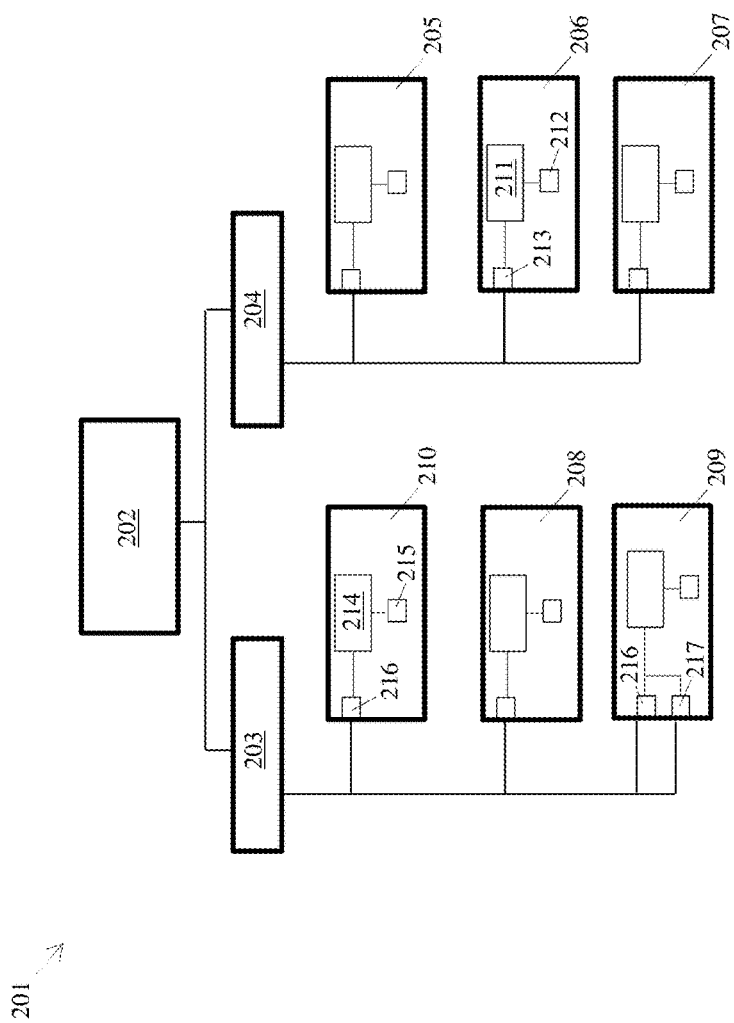
FIG. 2 illustrates an embodiment of the apparatus disclosed.

FIG. 2 illustrates an exemplary network 201 comprising a controller 202 in data communication through switches 203 and 204 with a group of host computers 205, 206, 207, 208, and 209. Controller 202 is additionally in data communication with central host 210 through switch 203 as illustrated. Each host computer on network 201 comprises a host processor, a host system clock, and one or more host network interfaces, such as host processor 211, host system clock 212, and host network interface 213 illustrated for host computer 206. Central host computer 210 similarly comprises central processor 214, central system clock 215, and typically a network interface 216. Each host computer is configured to transmit TCP packets to a destination address through its one or more host network interfaces, with the host processor of the host computer providing a TCP timestamp on a least some portion of the TCP packets. The TCP timestamp provided is based on a time provided by the respective host system clock. Further, each of the one or more host network interfaces comprising the host computers and central host has a source address. Central host computer 210 is configured to at least receive TCP packets transmitted by the plurality of host computers and addressed to the destination address of the central host computer. Typically, and as is understood, each host computer and the central host will both transmit TCP packets from an assigned source address to any other computer having a destination address in the network, and also receive TCP packets having a destination address corresponding to their source address from other computers in the network. Additionally, as illustrated, host computer 209 is a multi-homed host and is connected to communicate with network 201 via both network interface 216 and network interface 217. As a result, host computer 209 is present within network 201 under two distinct source addresses.

Within this disclosure, the plurality of host computers and the central host communicate over network 201 using TCP/IP protocol, and determination of clock skew utilizes TCP timestamps found in the TCP header. The TCP timestamp value for a given packets is determined by a virtual "timestamp clock" that is based on the frequency of operation of the transmitting device's system clock. The TCP timestamp is an optional field and not all communications exchanged are likely to have it, however by observing the values of TCP timestamps provided, one can observe the operation of the system clock. The TCP timestamp is a second-order effect of the system clock and is the means in which the clock skew is calculated in this disclosure.

As is understood, networked devices such as those depicted within network 201 typically all have internal electric clocks comprising both hardware and software components. These clocks control all timing functions for the device. Within these electronic clocks, crystal oscillators are used to determine the clock signal and the rate at which the clock "ticks." These crystal oscillators each operate at different, unique frequencies due to the crystal type, the manufacturing parameters, and the small imperfections that are inherent to all manufacturing procedures. This makes the system clock within a device a unique characteristic that can be exploited to identify that device. The clock skew of a device is the difference in the operating frequencies of its system clock relative to the clock frequency of another device. It is this parameter that can be used to identify the device based solely through passively observing network traffic. The determination of clock skew based on passive monitoring of traffic from a given host may be conducted using means known in the art. See e.g., Hohno et al., "Remote physical device fingerprinting," *IEEE Transactions on Dependable and Secure Computing* 2 (2005); see also Zander et al., "An Improved Clock-skew Measurement Technique for Revealing Hidden Services," 17*th USENIX Security Symposium*, San Jose, Calif. (2008); see also Polčák et al., "On reliability of clock-skew-based remote computer identification," 2014 11*th International Conference on Security and Cryptography* (*SECRYPT*), Vienna (2014), among others.

Generally, the disclosure identifies multi-homed hosts on a network by collecting TCP timestamp data from hosts in order to calculate the clock skew of the host for use as a fingerprint. The first step in the proposed process is to monitor and collect traffic across the network. The traffic of interest is the TCP segments exchanged between hosts, specifically those containing TCP timestamps. From this information, the clock skew of each host relative to a central host can be calculated. After the clock skews of each host on the network are determined, analysis may be conducted based on hypothesis testing using confidence intervals to identify potential multi-homed hosts.

As discussed, the apparatus and method disclosed here for the detection of a multi-homed host utilizes a plurality of host computers such as 205, 206, 207, 208, and 209 and a central host computer serving as the fingerprinter such as central host 210. Each host computer comprises a host processor, a host system clock, and one or more host network interfaces. The host processor of each host computer is programmed to transmit TCP packets to a destination address through its one or more host network interfaces, and additionally is programmed to provide a TCP timestamp on at least some portion of the TCP packets transmitted. The TCP timestamp is based on a time provided by the transmitting host system clock. Each of the one or more host network interfaces in each host computer also has a source address.

Figure 3:
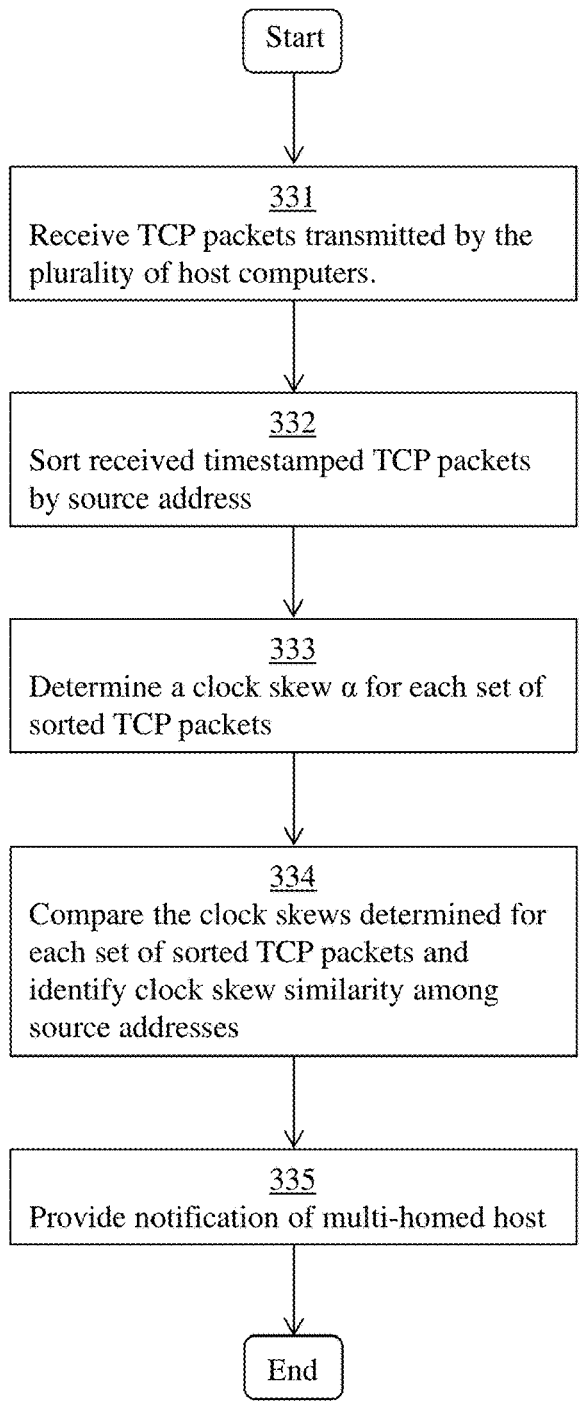
FIG. 3 illustrates an operation of the apparatus and method disclosed.

The central host computer such as central host 210 comprises at least a central processor such as 214 and central system clock such as 215. The central system clock of the central host computer serves as the reference clock for determining the clock skews of the host computers communicating on the network. The central processor of the central host computer is programmed to perform a series of steps in order to identify potentially multi-homed hosts. The process conducted by the central host computer is illustrated at FIG. 3.

At 331, the central processor of central host 210 is programmed to receive a group of TCP packets transmitted by the plurality of host computers 205, 206, 207, 208, and 209 and addressed to the destination address of central host 210. At 332, the central processor establishes sets of sorted TCP packets, where each set of sorted TCP packets comprises the TCP packets which have both a TCP timestamp and also share a common source address. The central processor thereby establishes two or more sets of sorted TCP packets, where each set is a collection of TCP packets from the same source address, and which also provide a timestamp. Typically in the course of a normal monitoring period, communication among and between all host computers and the central host computer will occur and the central host will receive traffic from every other host computer, such that a set of sorted TCP packets results for each source address present on the network.

At 333, the processor of the central host computer determines a clock skew α for each set of sorted TCP packets, using a means known in the art or as further detailed below. The clock skew α is based on a difference between the central system clock and the TCP timestamps comprising each TCP packet, so that the central system clock functions as a central point of reference for the fingerprinting. The processor treats the clock skew as an identifier associated with the source address from which the set of sorted TCP packets was received.

At 334, the central processor compares the clock skews determined and assesses similarity in order to determine if multiple source addresses originating from the same host are communicating over the network. The processor compares the clock skew α resulting from analysis of a first set of sorted TCP packets with the clock skew α resulting from a second set of sorted TCP packets and, if the clock skew α of the second set of sorted TCP packets is within a specified range bracketing the clock skew α of the first set of sorted TCP packets, the central processor identifies the source address corresponding to the first set of sorted TCP packets and the source address corresponding to the second set of sorted TCP packets as originating from a multi-homed host. Typically, at 335, the central processor provides some notification of multi-homed detection to, for example, a controller such as controller 202.

As is understood, over multiple receptions of TCP packets from a given host, the clock skew of the given host can be represented by a linear function described by $\alpha x_i + \beta = y_i$, where $x_i$ is a time offset, $y_i$ is a timestamp offset, and α is the clock skew. The time offset is dependent on a time of reception as recorded by the central system clock, and the timestamp offset is dependent on the TCP timestamps of the TCP packets received. Typically and as will be discussed, minimization of an objective function using data collected during monitoring of the network, for example following step 332 of FIG. 3, provides estimations for the parameters α and β.

Figure 4:
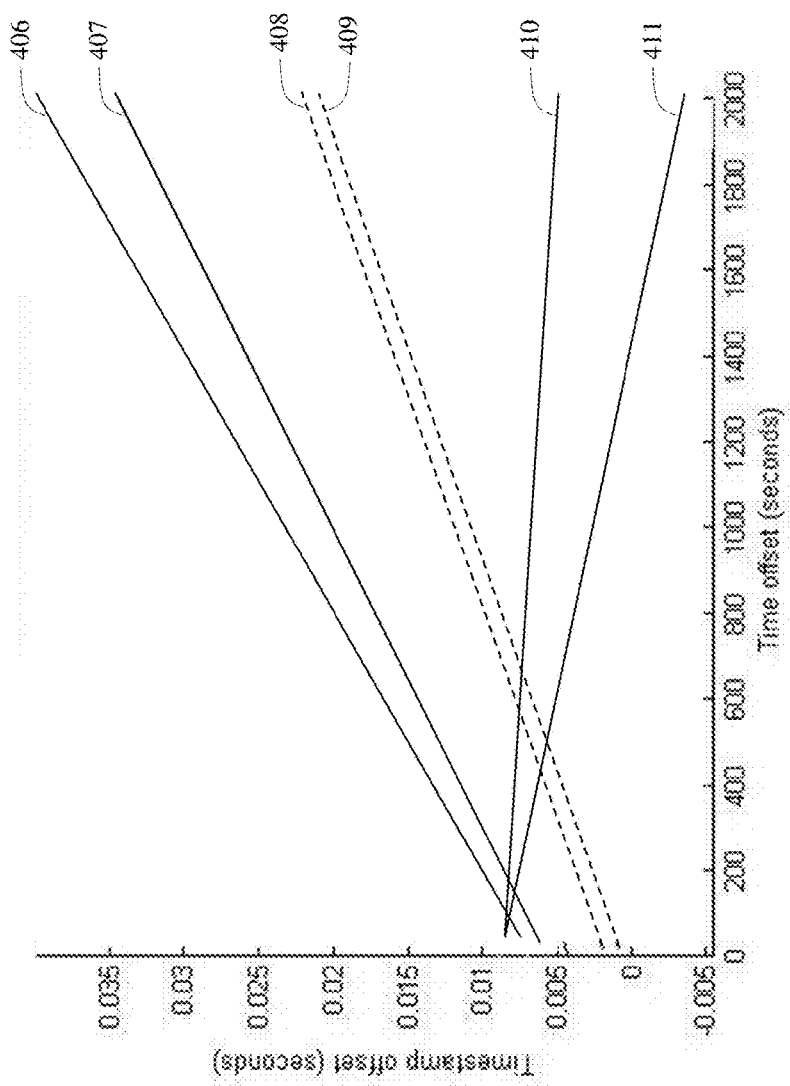
FIG. 4 illustrates a representation of clock skews detected in a network.

As an example, FIG. 4 illustrates exemplary clock skews determined and represented within linear functions as a result of central host computer 210 receiving traffic from all other hosts in network 201, identifying those packets having TCP timestamps, sorting the TCP timestamped packets by source address, and analyzing each set of sorted TCP packets in order to determine a clock skew associated with each source address. At FIG. 4, the resulting clock skews determined are represented by traces 406 through 411. Each of trace 406 through 411 represents the analysis of time-stamped traffic received by central host 210 and from a specific source address, and can be expressed as the linear function $\alpha x_i + = y_i$ with the associated clock skew $\alpha_i$ for each source address manifesting as the slope of the trace. In this exemplary situation, FIG. 4 indicates results where traces 408 and 409 are substantially parallel within a given threshold criteria, and the remaining traces 406, 407, 410, and 411 are neither parallel to 408 and 409 or parallel to any other trace represented. Correspondingly in this example, the central processor 214 of central host 210 is programmed to recognize the similar clock skews represented by traces 408 and 409 and conclude that the two distinct source addresses associated with traces 408 and 409 are likely to be originating from a single host computer. With knowledge of the source address assigned to each host computer in a network, the central host can likewise identify the multi-homed host. For example, at FIG. 4, trace 406 might represent a source address associated with host computer 205 of FIG. 2, trace 407 might represent a source address associated with host computer 206 of FIG. 2, trace 410 might represent a source address associated with host computer 207 of FIG. 2, and trace 411 might represent a source address associated with host computer 208 of FIG. 2, while traces 408, 409, or both might represent a source address associated with host computer 209. The central processor 214 of central host 210 would then identify host computer 209 as the multi-homed host transmitting to network 210 through multiple network interfaces, such as network interface 216 and network interface 217.

Generally the central processor is programmed to determine the specified range bracketing the clock skew α of the first set of sorted TCP packets by determining a lower threshold $C_L$ and an upper threshold $C_U$, around the clock skew α of the first set of sorted TCP packets, selected such that $C_L \leq \alpha_1 \leq C_U$. where $\alpha_1$ denotes the clock skew α of the first set of sorted TCP packets. $C_L$ and $C_U$ are typically selected using statistical methods to acknowledge an expected random variation around a mean value as will be discussed, however any method for determining $C_U$ and $C_L$ may be employed.

Figure 1:
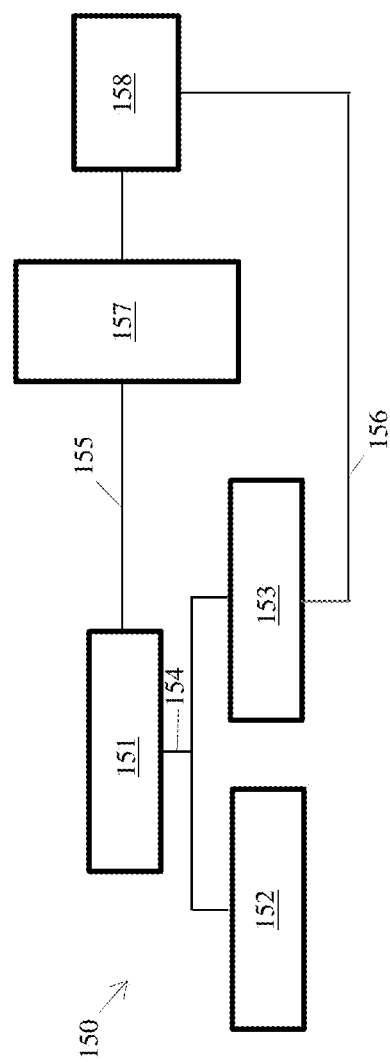
FIG. 1 illustrates an example of a multi-homed host bypassing a firewall.

Additionally and as discussed, each host computer and the central host are members of a particular network. In an embodiment, each host computer comprises at least one network interface providing a source address which indicates a specific network identifier and a host identifier, with the specific network identifier common to all the source addresses and the host identifier unique within the network. In some embodiments, the apparatus further comprises a controller such as controller 202, and the controller comprises a router having a public IP address, with the public IP address comprising the specific network identifier. In a still further embodiment, at least one of the one or more host network interfaces comprising the plurality of host computers is in data communication with an ISP and the ISP is in data communication with the router comprising the controller, similar to the configuration depicted at FIG. 1.

Figure 5:
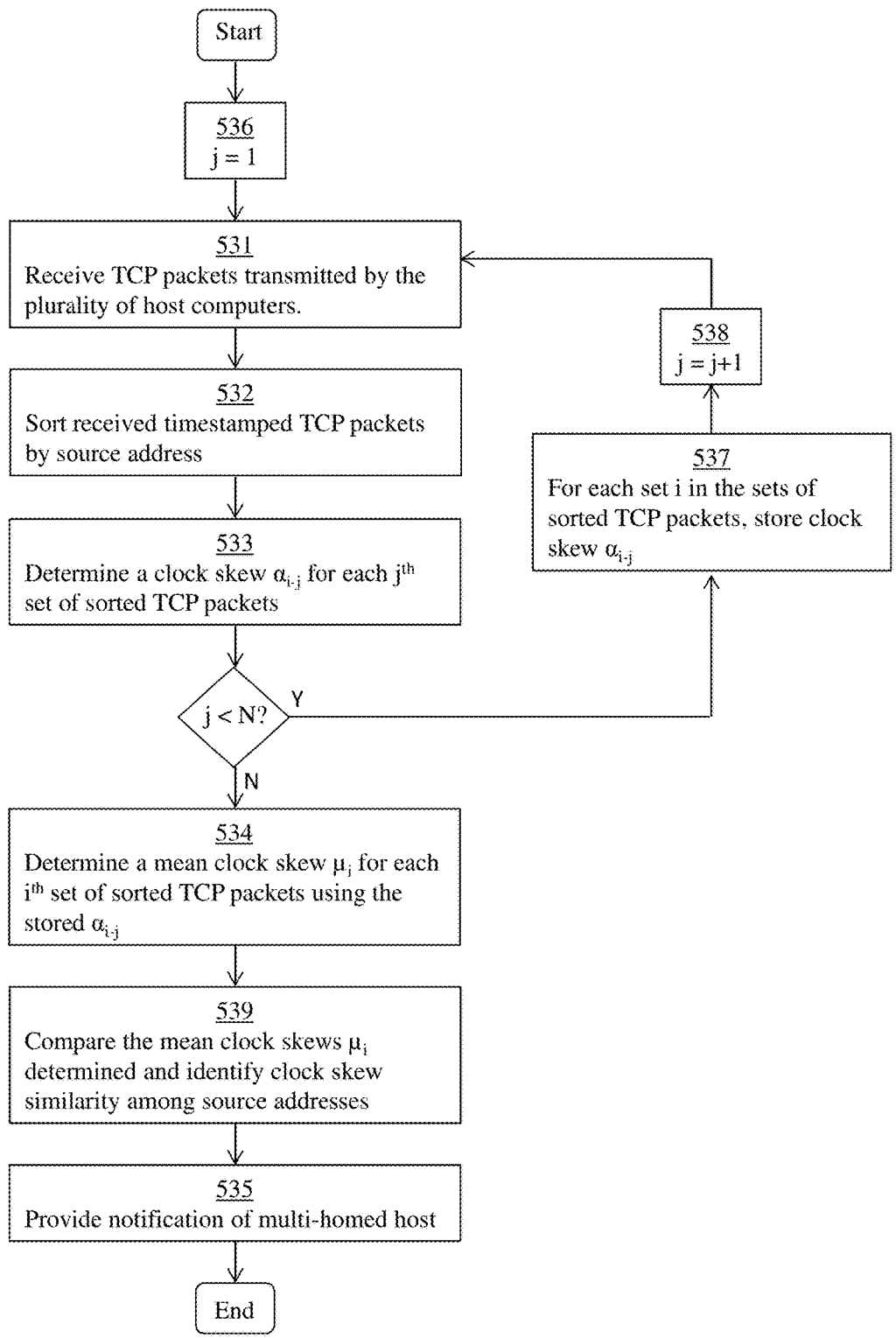
FIG. 5 illustrates another operation of the apparatus and method disclosed.

In certain embodiments, the central host computer is programmed to collect traffic and determine clocks skews over multiple iterations, determine a mean clock skew for each source address resulting from the iterations, and then compare the resulting mean clock skews for the identification of a multi-homed host or hosts. An example of this illustrated at FIG. 5. The process commences at Start and at 536 initializes a counting variable j. At 531, in a similar manner to that discussed for 331, the central processor of the central host receives a group of TCP packets transmitted by the plurality of host computers and addressed to the destination address of the central host. At 532, similar to 332, the central processor establishes sets of sorted TCP packets with each set of sorted TCP packets comprising TCP packets which have both a TCP timestamp and share a common source address. At 533, similar to 333, the central processor of the central host computer determines a clock skew $\alpha_{i\text{-}j}$ for each set of sorted TCP packets, where $\alpha_{i\text{-}j}$ denotes the determined clock skew of an $i^{th}$ set of sorted TCP packets determined during the $j^{th}$ iteration. After step 533, the process determines if the counting variable j is less than a desired number of iterations N, and if not, stores the $\alpha_{i\text{-}j}$ at step 537, increments the counting variable at 538, and returns to step 531 to conduct another iteration. Over the course of N iterations, this generates an $\alpha_{i\text{-}j}$ for each set of sorted TCP packets at each $j^{th}$ iteration, and since each set of sorted TCP packets comprises TCP packets having a common source address as discussed, at the conclusion of the iterations, each $i^{th}$ source address in the network that sends traffic to the central host computer has an associated plurality of $\alpha_{i\text{-}j}$.

When a number of iterations N has been completed, at 534 the processor determines a representative clock skew $\mu_i$ specific to each plurality of $\alpha_{i\text{-}j}$. At 539, the processor compares the representative clock skews $\mu_i$ determined and identifies clock skew similarity among source addresses, and typically at 535 provides some notification of a multi-homed detection before concluding at End.

The representative clock skew $\mu_i$ specific to each plurality of $\alpha_{i\text{-}j}$ is dependent on a set of clock skews comprising the each plurality of $\alpha_{i\text{-}j}$. In certain embodiments, the each plurality of serves as a dataset and a probability distribution P having a goodness-of-fit relative to the dataset is estimated, and the representative clock skew $\mu_i$ is selected based on the probability distribution P. Typically the probability distribution P is a measure on S such that $P(\Omega)=1$, where $\Omega$ is a sample space and S is a $\sigma$-algebra of subsets of $\Omega$ specified using the each plurality of such $\alpha_{i\text{-}j}$, that the probability distribution P provides the probability of occurrence of different possible clock skew values given the plurality of $\alpha_{i\text{-}j}$. The probability distribution P may be a discrete probability function or a continuous probability function. See e.g., A. Kumar and A. Chaudhry, *Probability Theory* ($3^{rd}$, 2008), among others. In certain embodiments, the representative clock skew $\mu_i$ is a function of a point on the fitted probability distribution. In some embodiments, the probability distribution is a normal distribution, and in other embodiments, the representative clock skew $\mu_i$ is an average value such as a mean, median, or mode of the probability distribution. In a further embodiment, a lower threshold $C_L$ and an upper threshold $C_U$ established around a given clock skew is based on a confidence interval defined by the probability distribution, such as 95%, and similarity between a first representative clock skew $\mu_{i\text{-}1}$ and a second representative clock skew $\mu_{i\text{-}2}$ is signified by the second representative clock skew $\mu_{i\text{-}2}$ being bounded by the confidence interval around the first representative clock skew $\mu_{i\text{-}1}$.

The disclosure additionally provides a method for detecting a multi-homed host generally comprising establishing a computer network comprising a plurality of host computers and a central host computer, and transmitting TCP packets from each host computer to the central host computer, where some portion of the TCP packets comprise a TCP timestamp based on a time provided by the host system clock of the host computer, and where each host computer has one or more host network interfaces providing a source address. The method further comprises receiving a group of TCP packets addressed to the central host computer, and establishing two or more sets of sorted TCP packets, where each set of sorted TCP packets comprises the TCP packets in the group of TCP packets having a TCP timestamp and sharing a common source address, then determining a clock skew $\alpha$ for each set of sorted TCP packets, with the clock skew $\alpha$ is based on a difference between a central system clock of the central host computer and the TCP timestamps within each set of the sorted TCP packets. The method further comprises comparing the clock skew $\alpha$ of a first set of sorted TCP packets and the clock skew $\alpha$ of a second set of sorted TCP packets and determining if the clock skew $\alpha$ of the second set of sorted TCP packets is within a specified range bracketing the clock skew $\alpha$ of the first set of sorted TCP packets, and if so, identifying the source address shared by the first set of sorted TCP packets and the source address shared by the second set of sorted TCP packets as a multi-homed host.

EXAMPLES

Figure 6:
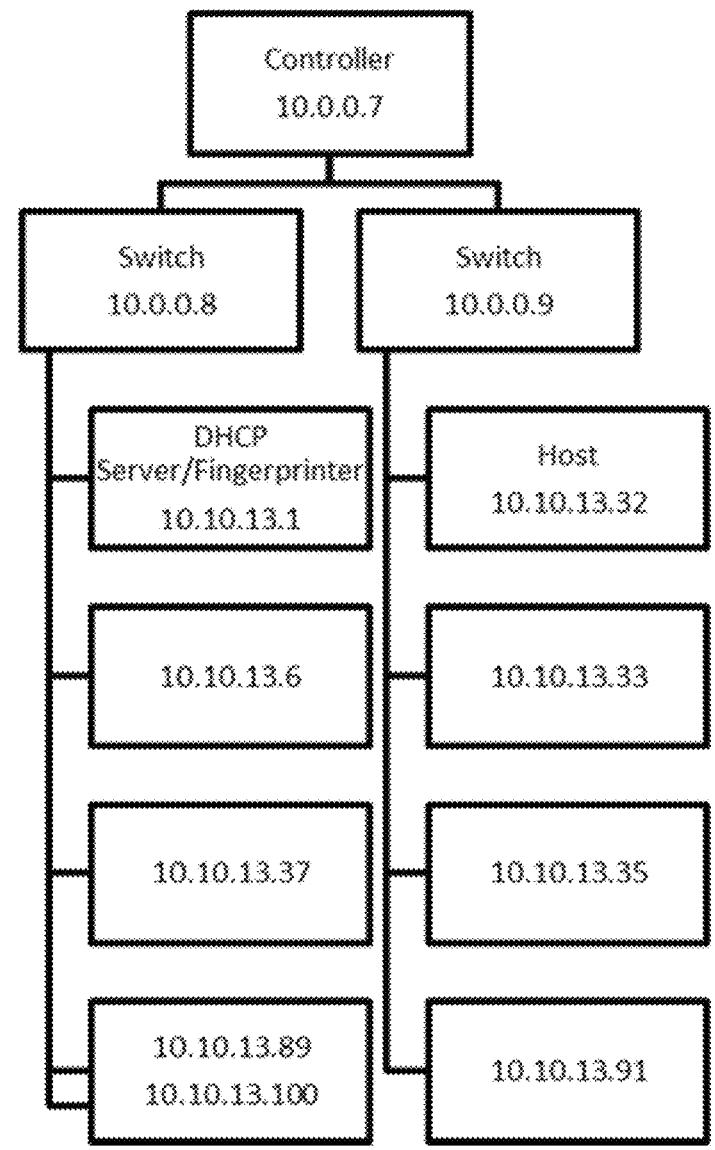
FIG. 6 illustrates another embodiment of the apparatus disclosed.

The apparatus and method was tested by collecting and analyzing traffic from hosts on a Software Developed Network (SDN) test bed illustrated at FIG. 6 as 601. Multiple hosts were connected to each switch with one host among them being multi-homed. The multi-homed host used separate Ethernet connections to connect to the network. A central host acted as the fingerprinter for determining the clock skews of all hosts on the network. The fingerprinter was chosen so that it had the ability to observe traffic from both connections of the multi-homed host. Network traffic containing TCP segments with timestamps was collected and using this data, the clock skew of each host was calculated. The SDN test bed comprised two HP switches and seven Raspberry Pis as hosts. The switches used were the HP 2920 and the HP 3800, and the Raspberry Pis were connected to the network using their built-in 10/100 Mbps Ethernet connection.

One of the Raspberry Pis had an added USB 2.0 Gigabit LAN adapter that was used as its second connection to the network. This was the dual-homed device used in testing and the host that was to be experimentally identified. This host used the IP addresses 10.10.13.89 and 10.10.13.100. Both connections from this host were connected to the HP 2920 switch. Also connected to the network was a DELL T1600 running UBUNTU that was acting as the DHCP server for the network. The DHCP server was used as the fingerprinter in this experiment and was chosen due to the fact that it maintained a static IP address of 10.10.13.1 throughout testing.

In order to establish the necessary TCP connections for the purpose of creating TCP timestamps, traffic was generated by creating a Secure Shell (SSH) connection between the fingerprinter and the hosts on the network. This SSH connection allowed for the required TCP handshakes to be made and timestamps to be exchanged between the host and the fingerprinter for collection. Packets with TCP timestamps that were originating from a host were collected using the network protocol analyzer WIRESHARK, which provided timestamp values (TSVal) and timestamp echo replies (TSecr).

Figure 7:
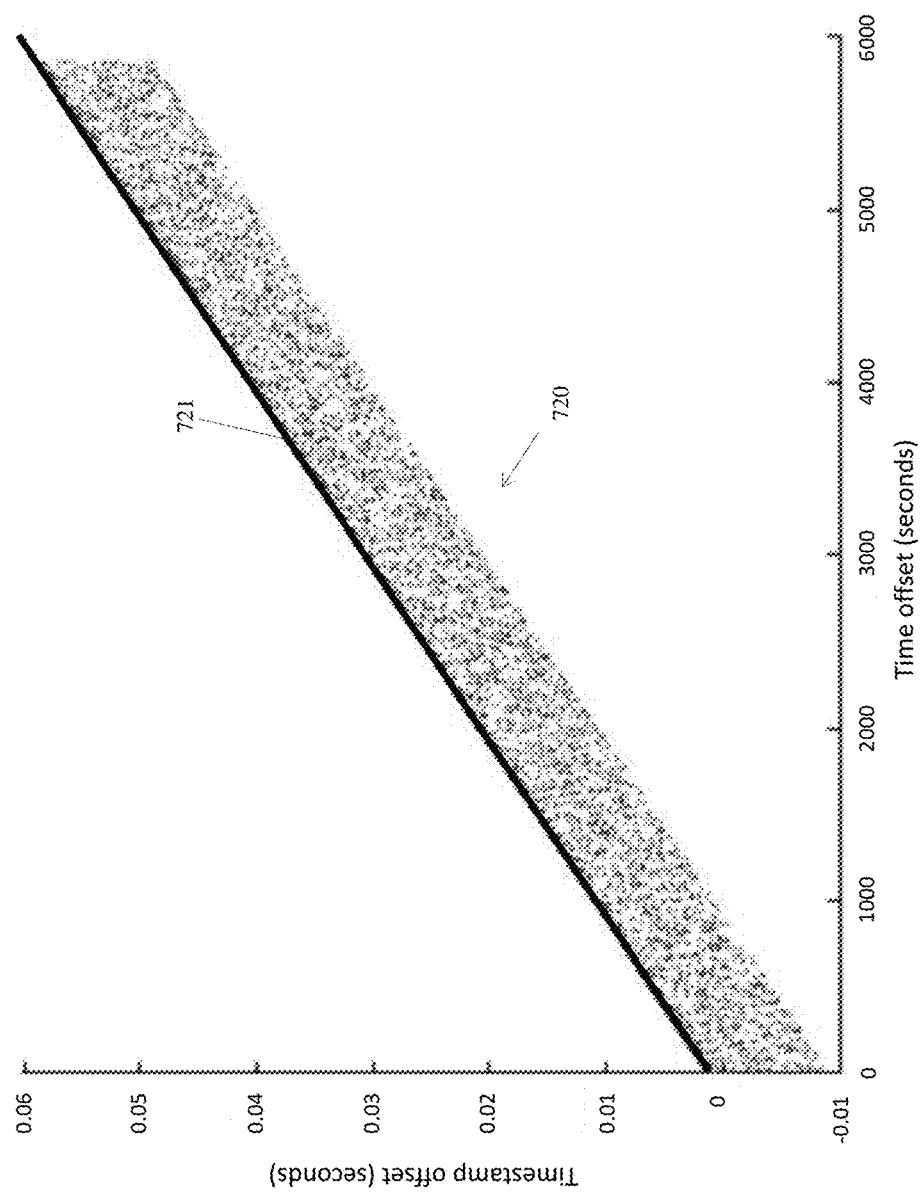
FIG. 7 illustrates a representation of clock skew determined from a population of data.

Given the test traffic collected by WIRESHARK, the next step was to calculate the clock skew of each host. One hundred samples of data were collected at ten minute intervals, and MATLAB was used for calculations. The MATLAB function linprog was used to solve the linear function $\alpha x_i + \beta = y_i$ for each host and provide the values of $\alpha$ and $\beta$. As discussed, the value of $\alpha$ corresponds to the clock skew and is the value of concern in this scenario and was calculated independently for each trial. The upper-bound solution, which was used because the delays found within a network between hosts are all positive, for a set of points $O_T$ was solved for each host. For example, FIG. 7 illustrates the solution for a set of data points generally indicated by 720 and corresponding to host 10.10.13.100, which provides a slope of 0.0000101203 or 10.1203 ppm (μsec/sec) for the line 721 representing the upper bound of the data set. This slope is the clock skew $\alpha$ for this host when compared to the clock of the fingerprinter, 10.10.13.1.

Figure 8:
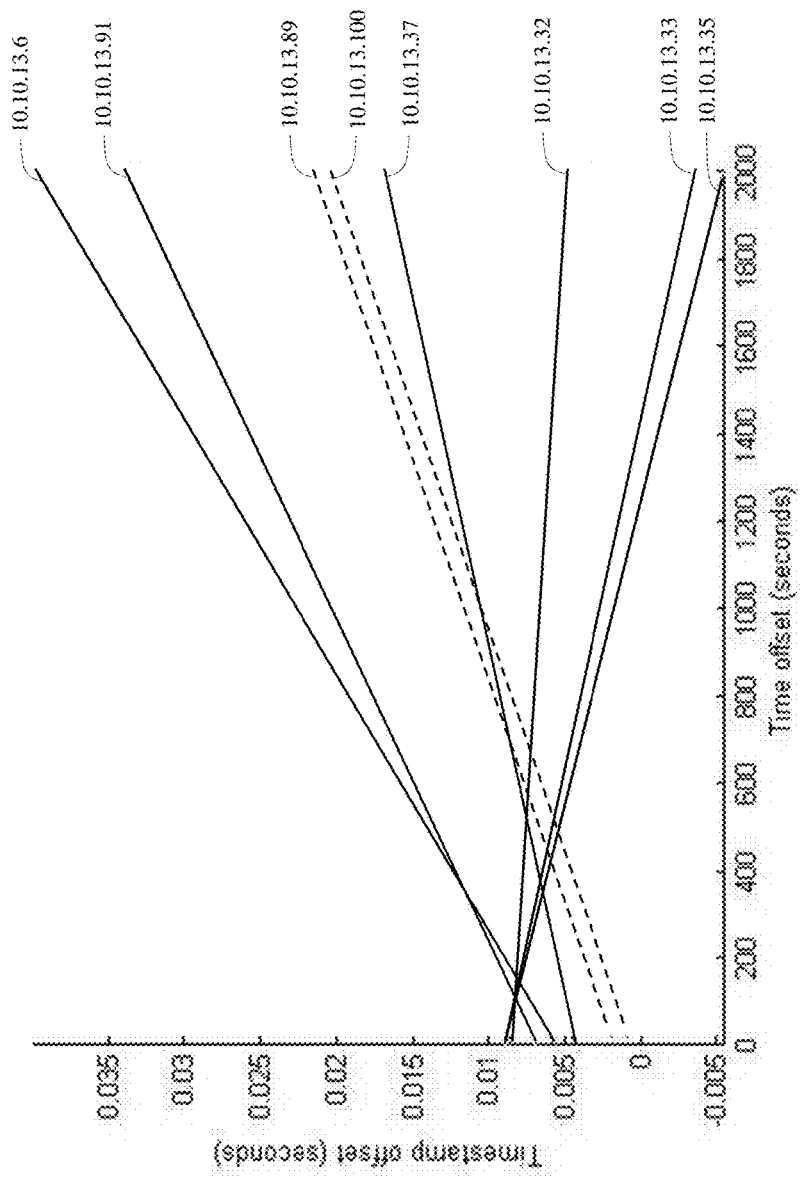
FIG. 8 illustrates a representation of clock skews detected in second network.

Comparing the slopes for the upper-bound solution of the data sets of all hosts over a single trial shows the variation of the clock skews found in the exemplary network. As seen in FIG. 8 for hosts 10.10.13.6, 10.10.13.91, 10.10.13.89, 10.10.13.100, 10.10.13.37, 10.10.13.32, 10.10.13.33, and 10.10.13.35, there is a range of positive and negative values for various clock skews corresponding to a host's clock being ahead of or behind the clock of the fingerprinter. As indicated, the hosts using the IP addresses of 10.10.13.89 and 10.10.13.100 both have solutions with similar slopes and stand out as possibly being multi-homed due to the fact that the solution for each host appears to be represented by two parallel lines.

Figure 9:
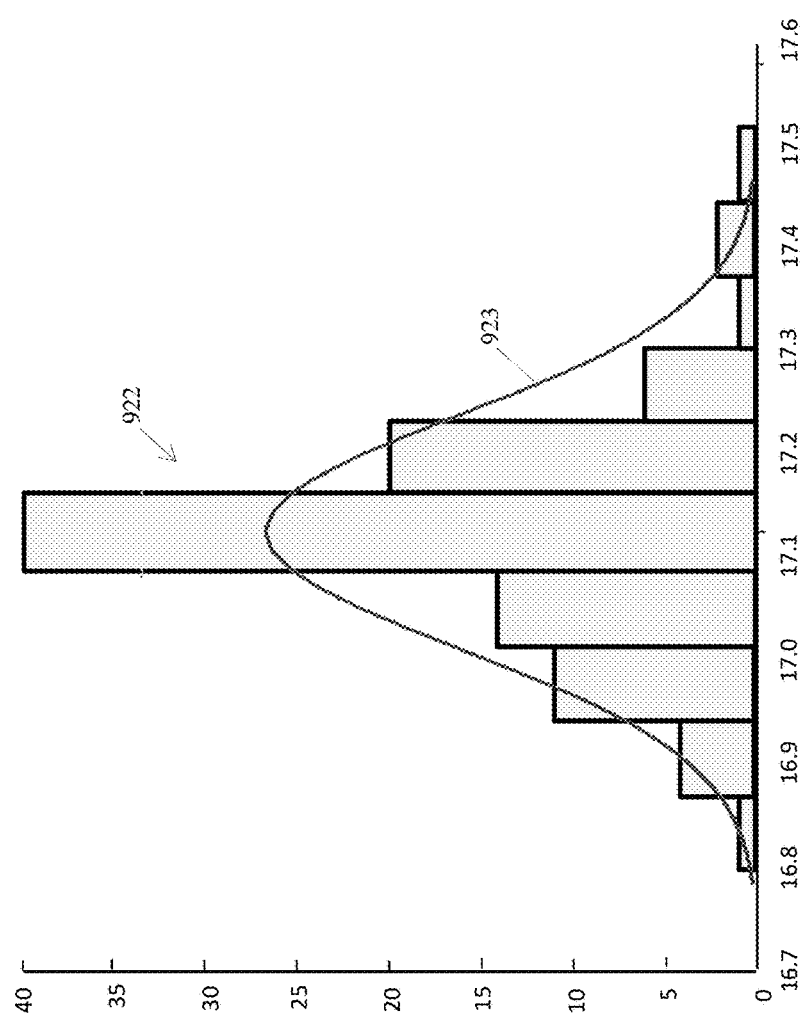
FIG. 9 illustrates a probability distribution fitted to a plurality of clock skews.

The data in FIG. 8 is supported by further trials. The mean value for each clock skew after 100 iterations of the trial described above is depicted in Table 1, and indicates that the clock skews for 10.10.13.89 and 10.10.13.100 are similar. When compared to the differences between clock skews of the other hosts tested, as shown in Table 2, the difference between 10.10.13.89 and 10.10.13.100 appears to be negligible. For these comparisons and for the calculation of the confidence intervals, the data over the 100 iterations was assumed to approach a Gaussian distribution. As an example, and as shown in FIG. 9, a histogram generally indicated at 922 for the range of clock skews collected for host 10.10.13.6 over these trials approaches the normal distribution represented at 923. Utilizing a similarly fitted Gaussian for each host, a 95% confidence interval for the clock skew of each host was calculated over the 100 trials conducted. The confidence interval was solved using the paramci function within MATLAB. The confidence interval for each clock skew is quite small, which suggests that the clock skew varies only slightly over time, as observed in previous works.

The mean clock skew of each host was compared to the confidence interval calculated for all other hosts in order to identify a possible dual-homed host. The upper and lower bounds of the 95% confidence interval for the clock skews of all hosts are shown in Table 3, along with the mean value of the clock skews calculated over the 100 trials. When the mean value of each calculated clock skew is compared to the confidence interval of the clock skew for each host, it is observed that the possible dual homed hosts are 10.10.13.89 and 10.10.13.100. The hosts represented by the IP addresses of 10.10.13.89 and 10.10.13.100 fall within each other's confidence interval, while the other hosts remain outside of these bounds. These results confirm the initial network setup where the hosts represented by the IP addresses 10.10.13.89 and 10.10.13.100 were from the same Raspberry Pi.

Figure 10:
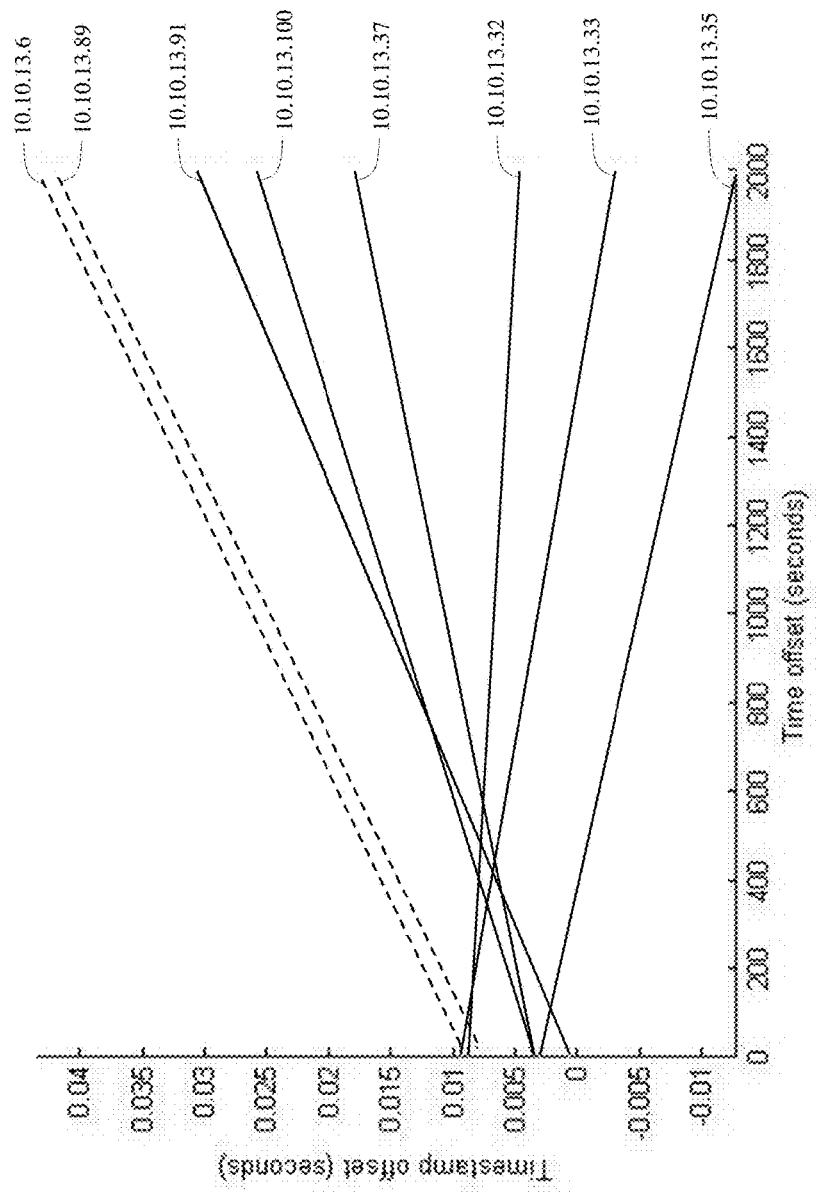
FIG. 10 illustrates a representation of clock skews detected in a third network.

The results from this testing were validated by moving the dual-homed connection to another device and repeating the proposed detection scheme. The USB 2.0 Gigabit LAN adapter was removed from the host using the IP addresses 10.10.13.89 and 10.10.13.100 to the host that was previously using the IP address 10.10.13.6. This device was now the dual-homed device and was also using the IP address of 10.10.13.89. After generating traffic as in the previous experiment and calculating the clock skews, the dual-homed connection could still be detected. As shown in FIG. 10 for the hosts 10.10.13.6, 10.10.13.91, 10.10.13.89, 10.10.13.100, 10.10.13.37, 10.10.13.32, 10.10.13.33, and 10.10.13.35, the upper bound solutions for the hosts 10.10.13.89 and 10.10.13.100 are no longer parallel, and instead the parallel solution has shifted to 10.10.13.6 and 10.10.13.89. This supports the change in network configuration.

Figure 11:
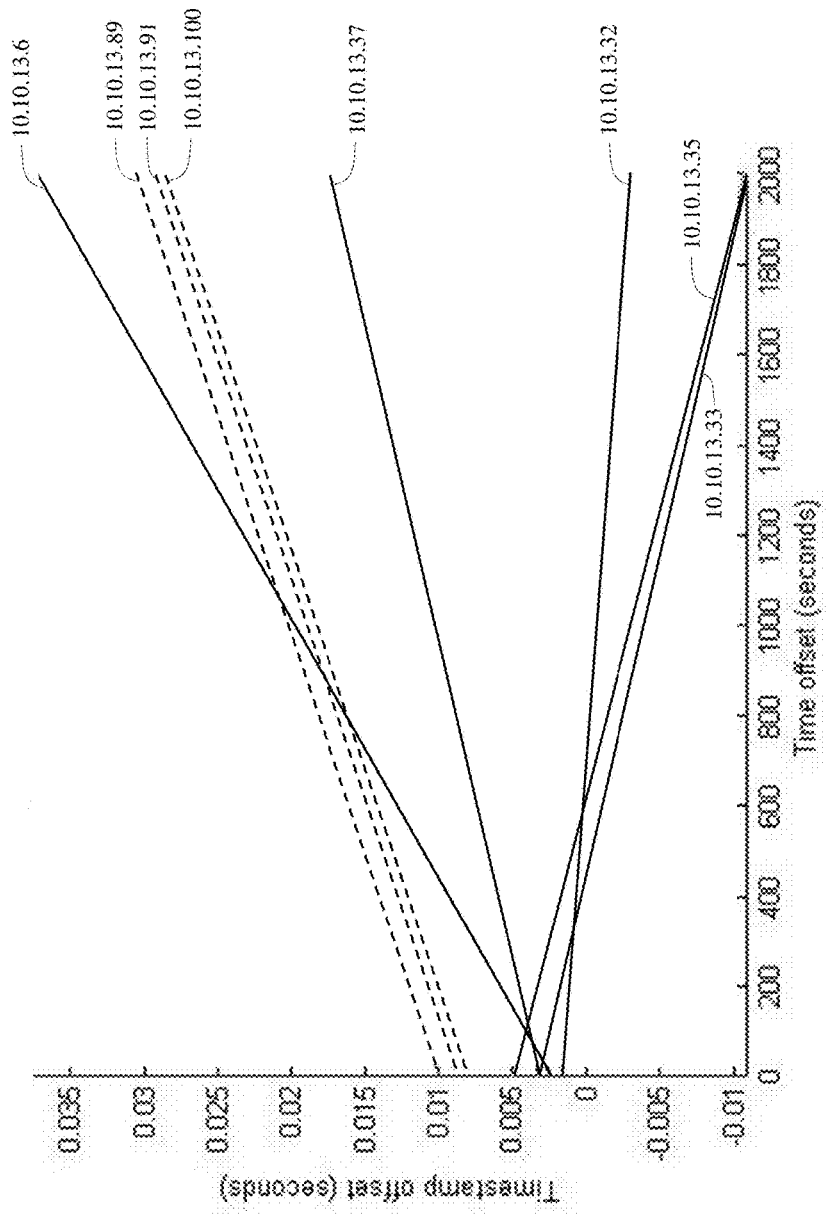
FIG. 11 illustrates a representation of clock skews detected in a fourth network.

The final validation of the proposed scheme was to add a host with three interfaces to the network and attempt its detection. A Raspberry Pi was connected to the network using its standard built in Ethernet connection as well as with two USB to Ethernet adapters. These interfaces were assigned with the IP addresses of 10.10.13.89, 10.10.13.91, and 10.10.13.100. As in the previous sections, the clock skew for all hosts on the network were calculated, and the proposed scheme was used to correlate any possible multi-home connections. As seen in FIG. 11 for the hosts 10.10.13.6, 10.10.13.91, 10.10.13.89, 10.10.13.100, 10.10.13.37, 10.10.13.32, 10.10.13.33, and 10.10.13.35, there are now three parallel lines corresponding to 10.10.13.91, 10.10.13.89, and 10.10.13.100, suggesting that these IP addresses are from the multi-homed host.

As discussed, the clock skew is a physical trait of a host's processor caused by the different operating frequencies of crystal oscillators within electronic clocks. The discrepancy in operating frequencies is a product of the manufacturing process and results in small differences in clock speed of each clock. This difference in frequencies between the system clocks of separate devices is calculated as the first derivative of a function that includes the offset of their observed times.

Once the TCP timestamps have been collected, the clock skew can be calculated based on various procedures known in the art. The first step is to determine the time and TCP timestamp offsets of a collected packet versus the initial time of collection. The first packet collected by the fingerprinter from a host is used as the baseline for the offset. The time offset is given by:

$$x_i = t_i - t_1;$$

where $x_i$ is the difference between the time of collection of the $i^{th}$ packet at time $t_i$ and the initial time of collection $t_1$. The timestamp offset wi for the $i^{th}$ packet is given by:

$$w_i = \frac{T_i - T_1}{f};$$

where $T_i$ is the timestamp of the $i^{th}$ packet, $T_1$ is the timestamp of the first packet at the initial time of collection and $f$ is the operating frequency of the host's clock.

Once the time and timestamp offsets are known, the difference $y_i$ between the observed time at the fingerprinter and the observed time from the source host based on its timestamps is calculated as:

$$y_i = w_i - x_i.$$

Given the set of points x and y for the data collected, the set of offset values $O_T$ for N collected packets is represented as:

$$O_T = \{(x_i, y_i) : i \in \{1, \ldots, N\}\},$$

and the data models as a slope-intercept line equation. The clock skew is the first derivative (or slope) $\alpha$ of this line $\alpha x_i + \beta \geq y_i$, with a y-intercept of $\beta$ that fits the upper bound of the set of points $O_T$. The solution is obtained using a linear programming technique with the goal to minimize the objective function J:

$$J = \frac{1}{N} \sum_{i=1}^{N} (\alpha x_i + \beta - y_i)$$

for N packets. This procedure is repeated for each host on the network.

Confidence intervals are used in this disclosure in certain embodiments to bound the uncertainty of the calculated clock skews due to the randomness of the data collected and because the true mean value of the clock skew $\mu$ cannot be exactly measured or known. Generally, the clock skew is a random variable a that is assumed to be Gaussian with a density function $f(a)$. A confidence interval provides a range of values in which the true calculated mean value lies with a specified probability $1-\varepsilon$.

The confidence interval is defined as the range of $C_L$ to $C_U$ such that:

$$P[C_L \leq z \leq C_U] = C,$$

where C is the desired confidence probability between zero and one for a given parameter z. The value C is equal to $1-\varepsilon$, where $\varepsilon$ is the acceptable error. The bounds of this confidence interval $C_L$ and $C_U$ are determined by solving:

$$\frac{\varepsilon}{2} = \int_{C_U}^{\infty} f_\alpha(\alpha) d\alpha$$

and $$\frac{\varepsilon}{2} = \int_{-\infty}^{C_L} f_\alpha(\alpha) d\alpha.$$

Confidence intervals are used in hypothesis testing to decide between two possible scenarios. If a hypothesis $H_0$ is made about a parameter and that parameter falls within the range of a confidence interval, then that hypothesis is accepted with a confidence level of C. In certain embodiments, this idea is used to analyze the clock skews of the devices on the network to determine if they originate from the same device.

Thus, provided here is an apparatus and method for identification of multi-homed hosts. On a computer network. The apparatus and method utilizes a plurality of host computers and a central host, where each host computer has one or more network interfaces and transmits TCP packets over the network to generally the other hosts and the central host. The central host monitors exchanged traffic, sorts received timestamped TCP packets by source address, and utilizes the sorted packets to determine a clock skew associated with each source address. Typically, the host computer conducts this process over multiple iterations and determines a representative clock skew for the source address using a statistical analysis of the plurality. The representative clock skews are compared in order to determine possible similarity and identify potentially multi-homed hosts.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

TABLE 1

Mean Clock Skew of All Hosts over 100 Trials (in ppm)

| Host | Clock skew (ppm) |
|---|---|
| 10.10.13.6 | 17.126 |
| 10.10.13.32 | −1.953 |
| 10.10.13.33 | −6.405 |
| 10.10.13.35 | −7.313 |
| 10.10.13.37 | 6.700 |
| 10.10.13.89 | 10.132 |
| 10.10.13.91 | 13.020 |
| 10.10.13.100 | 10.140 |

TABLE 2

Difference of Clock Skew Between All Hosts (in ppm)

| Host | 10.10.13.6 | 10.10.13.32 | 10.10.13.33 | 10.10.13.35 | 10.10.13.37 | 1010.13.89 | 10.10.13.89 | 10.10.13.100 |
|---|---|---|---|---|---|---|---|---|
| 10.10.13.6 | 0 | 19.078 | 23.531 | 24.439 | 10.426 | 6.994 | 4.106 | 6.986 |
| 10.10.13.32 | | 0 | 4.453 | 5.36 | 8.653 | 12.084 | 14.972 | 12.092 |
| 10.10.13.33 | | | 0 | 0.908 | 13.105 | 16.537 | 19.425 | 16.545 |
| 10.10.13.35 | | | | 0 | 14.013 | 17.445 | 20.332 | 17.452 |
| 10.10.13.37 | | | | | 0 | 3.432 | 6.32 | 3.44 |
| 10.10.13.89 | | | | | | 0 | 2.838 | 0.008 |

TABLE 2-continued

Difference of Clock Skew Between All Hosts (in ppm)

| Host | 10.10.13.6 | 10.10.13.32 | 10.10.13.33 | 10.10.13.35 | 10.10.13.37 | 1010.13.89 | 10.10.13.89 | 10.10.13.100 |
|---|---|---|---|---|---|---|---|---|
| 10.10.13.91 | | | | | | | 0 | 2.88 |
| 10.10.13.100 | | | | | | | | 0 |

TABLE 3

Upper and Lower Bounds of the 95% Confidence Interval of Each Hosts Clock Skew

| Host | 10.10.13.6 | 10.10.13.32 | 10.10.13.33 | 10.10.13.35 | 10.10.13.37 | 10.10.13.89 | 10.10.13.91 | 10.10.13.100 |
|---|---|---|---|---|---|---|---|---|
| Upper Bound CI | 17.147 | −1.860 | −6.276 | −7.184 | 6.757 | 10.171 | 13.085 | 10.176 |
| Mean Value | 17.126 | −1.953 | −6.405 | −7.313 | 6.7 | 10.132 | 13.02 | 10.14 |
| Lower Bound CI | 17.104 | −2.045 | −6.534 | −7.441 | 6.643 | 10.093 | 12.955 | 10.104 |

What is claimed is:

1. An apparatus for detecting a multi-homed host on a computer network comprising:
a plurality of host computers where each host computer comprises a host processor, a host system clock, and one or more host network interfaces, where the host processor is programmed to transmit TCP packets to a destination address through the one or more host network interfaces, and where the host processor is programmed to provide a TCP timestamp on some portion of the TCP packets, where the TCP timestamp is based on a time provided by the host system clock, and where each of the one or more host network interfaces has a source address; and
a central host computer where the central host computer comprises a central processor and a central system clock, where the central processor is programmed to perform steps comprising:
receiving a group of TCP packets, where the group of TCP packets are the TCP packets transmitted by the plurality of host computers and addressed to a destination address of the central host computer;
establishing two or more sets of sorted TCP packets, where each set of sorted TCP packets comprises the TCP packets in the group of TCP packets having a TCP timestamp and sharing a common source address;
determining a clock skew $\alpha$ for each set of sorted TCP packets, where the clock skew $\alpha$ is based on a difference between the central system clock and the TCP timestamps within the each set of sorted TCP packets; and
comparing the clock skew $\alpha$ of a first set of sorted TCP packets and the clock skew $\alpha$ of a second set of sorted TCP packets and, if the clock skew $\alpha$ of the second set of sorted TCP packets is within a specified range bracketing the clock skew $\alpha$ of the first set of sorted TCP packets, identifying the source address shared by the first set of sorted TCP packets and the source address shared by the second set of sorted TCP packets as the multi-homed host, thereby detecting the multi-homed host on the computer network.

2. The apparatus of claim 1 where each host system clock and the central system clock comprise a crystal oscillator comprising a crystal of a piezoelectric material.

3. The apparatus of claim 2 further comprising a controller in data communication with each host computer in the plurality of host computers and in data communication with the central host computer.

4. The apparatus of claim 3 where the source address of every host network interface comprises a specific network identifier and a host identifier, and where the source address of at least one of the one or more host network interfaces comprising every host computer comprises the specific network identifier, and where the destination address of the central host computer comprises the specific network identifier.

5. The apparatus of claim 4 where the controller comprises a router having a public IP address, where the public IP address comprises the specific network identifier.

6. The apparatus of claim 5 where at least one of the one or more host network interfaces comprising the plurality of host computers is in data communication with an ISP, where the ISP is in data communication with the router.

7. The apparatus of claim 1 where the central processor is further programmed to determine the specified range bracketing the clock skew $\alpha$ of the first set of sorted TCP packets by performing steps comprising:
determining, for the clock skew $\alpha$ of the first set of sorted TCP packets, a lower threshold $C_L$ and an upper threshold $C_U$, where $C_L \leq \alpha \leq C_U$; and
establishing the specified range bracketing the clock skew $\alpha$ of the first set of sorted TCP packets as a range bounded by $C_L$ and $C_U$.

8. The apparatus of claim 1 where the central processor is further programmed to determine the clock skew $\alpha$ for the each set of sorted TCP packets by performing steps comprising:
determining a $t_1$ for the each set of sorted TCP packets, where the $t_1$ is a chronological time determined by the central system clock recording when the earliest TCP packet in the each set of sorted TCP packets was received by the central host computer;
calculating a $T_1$ for the each set of sorted TCP packets, where the $T_1$ is the TCP timestamp of the earliest TCP packet in the each set of sorted TCP packets received by the central host computer;
quantifying, for each TCP packet in the each set of sorted TCP packets, a time offset $x_i$ and a timestamp offset $w_i$, where the time offset $x_i$ comprises a first difference equal to a $t_i$ minus the $t_1$, where the $t_i$ is a chronological time determined by the central system clock recording when the each TCP packet in the each set of sorted TCP packets was received by the central host computer, and where the timestamp offset $w_i$ comprises a second difference equal to a $T_i$ minus the $T_1$, where the $T_i$ is the TCP timestamp of the each TCP packet in the each set of sorted TCP packets received by the central host computer, and determining a difference $y_i$, where the difference $y_i$ comprises a third difference equal to the $w_i$ minus the $x_i$, thereby determining an ($x_i$, $y_i$) for the each TCP packet in the each set of sorted TCP packets; and estimating the clock skew α by minimizing an objective function J over some portion of the each set of sorted TCP packets, where the objective function J comprises ($\alpha x_i + \beta - y_i$).

9. The apparatus of claim 1 where the central processor is further programmed to perform steps comprising:
- performing two or more iterations of the steps of receiving the group of TCP packets, establishing two or more sets of sorted TCP packets, and determining the clock skew α for each set of sorted TCP packets, thereby generating a plurality of clock skews $\alpha_{i-j}$ for each source address;
- computing a representative clock skew $\mu_i$ for the each source address using the plurality of clock skews $\alpha_{i-j}$ for the each source address; and
- comparing the clock skew α of the first set of sorted TCP packets and the clock skew α of the second set of sorted TCP packets by utilizing the representative clock skew $\mu_i$ for a first source address as the clock skew α of the first set of sorted TCP packets and utilizing the representative clock skew $\mu_i$ for a second source address as the clock skew α of the second set of sorted TCP packets, and utilizing the first source address as the source address shared by the first set of sorted TCP packets and utilizing the second source address as the source address shared by the second set of sorted TCP packets.

10. An apparatus for detecting a multi-homed host on a computer network comprising:
- a plurality of host computers where each host computer comprises a host processor, a host system clock, and one or more host network interfaces, where the host processor is programmed to transmit TCP packets to a destination address through the one or more host network interfaces, and where the host processor is programmed to provide a TCP timestamp on some portion of the TCP packets, where the TCP timestamp is based on a time provided by the host system clock, and where each of the one or more host network interfaces has a source address; and
- a central host computer where the central host computer comprises a central processor and a central system clock, and where the central processor is programmed to perform steps comprising:
  - receiving a group of TCP packets, where the group of TCP packets are the TCP packets transmitted by the plurality of host computers and addressed to a destination address of the central host computer;
  - establishing two or more sets of sorted TCP packets, where each set of sorted TCP packets comprises the TCP packets in the group of TCP packets having a TCP timestamp and sharing a common source address;
  - determining a clock skew α for each set of sorted TCP packets, where the clock skew α is based on a difference between the central system clock and the TCP timestamps within the each set of sorted TCP packets;
  - repeating the receiving the group of TCP packets, the establishing two or more sets of sorted TCP packets, and the determining the clock skew α for each set of sorted TCP packets one or more times, thereby generating a plurality of clock skews $\alpha_{i-j}$ for each source address;
  - computing a representative clock skew $\mu_i$ for each plurality of clock skews $\alpha_{i-j}$, thereby computing the representative clock skew $\mu_i$ for every source address;
  - determining, for the representative clock skew $\mu_i$ for a first source address, a lower threshold $C_L$ and an upper threshold $C_U$, where the lower threshold $C_L$ is less than or equal to the representative clock skew $\mu_i$ for the first source address and where the upper threshold $C_U$ is greater than or equal to the representative clock skew $\mu_i$ for the first source address; and
  - comparing the representative clock skew $\mu_i$ for a second source address with the lower threshold $C_L$ and the upper threshold $C_U$, and if the lower threshold $C_L$ is less than or equal to the representative clock skew $\mu_i$ for the second source address and the upper threshold $C_U$ is greater than or equal to the representative clock skew $\mu_i$ for the second source address, identifying the first source address and the second source address as the multi-homed host, thereby detecting the multi-homed host on the computer network.

11. The apparatus of claim 10 where the central processor is further programmed to compute the representative clock skew $\mu_i$ for each plurality of clock skews $\alpha_{i-j}$ by determining a probability distribution P for the each plurality of clock skews $\alpha_{i-j}$, where the probability distribution P has a goodness-of-fit relative to the each plurality of clock skews $\alpha_{i-j}$, and where the representative clock skew $\mu_i$ for the each plurality of clock skews $\alpha_{i-j}$ is a function of the probability distribution P for the each plurality of clock skews $\alpha_{i-j}$.

12. The apparatus of claim 10 where the central processor is further programmed to determine the lower threshold $C_L$ and the upper threshold $C_U$ by determining a confidence interval over the probability distribution P for the each plurality of clock skews $\alpha_{i-j}$.

13. The apparatus of claim 12 where the central processor is further programmed to determine the clock skew α for the each set of sorted TCP packets by performing steps comprising:
- determining a $t_1$ for the each set of sorted TCP packets, where the $t_1$ is a chronological time determined by the central system clock recording when the earliest TCP packet in the each set of sorted TCP packets was received by the central host computer;
- calculating a $T_1$ for the each set of sorted TCP packets, where the $t_1$ is the TCP timestamp of the earliest TCP packet in the each set of sorted TCP packets received by the central host computer;
- quantifying, for each TCP packet in the each set of sorted TCP packets, a time offset $x_i$ and a timestamp offset $w_i$, where the time offset $x_i$ comprises a first difference equal to a $t_i$ minus the $t_1$, where the $t_i$ is a chronological time determined by the central system clock recording when the each TCP packet in the each set of sorted TCP packets was received by the central host computer, and where the timestamp offset $w_i$ comprises a second difference equal to a $T_i$ minus the $T_1$, where the $T_i$ is the TCP timestamp of the each TCP packet in the each set of sorted TCP packets received by the central host computer, and determining a difference $y_i$, where the difference $y_i$ comprises a third difference equal to the $w_i$ minus the $x_i$, thereby determining an $(x_i, y_i)$ for the each TCP packet in the each set of sorted TCP packets; and estimating the clock skew α by minimizing an objective function J over some portion of the each set of sorted TCP packets, where the objective function J comprises $(\alpha x_i + \beta - y_i)$.

14. The apparatus of claim 13 where each host system clock and the central system clock comprise a crystal oscillator comprising a crystal of a piezoelectric material.

15. The apparatus of claim 14 further comprising a controller in data communication with each host computer in the plurality of host computers and in data communication with the central host computer.

16. The apparatus of claim 15 where the source address of every host network interface comprises a specific network identifier and a host identifier, and where the source address of at least one of the one or more host network interfaces comprising every host computer comprises the specific network identifier, and where the destination address of the central host computer comprises the specific network identifier.

17. The apparatus of claim 16 where the controller comprises a router having a public IP address, where the public IP address comprises the specific network identifier.

18. The apparatus of claim 17 where at least one of the one or more host network interfaces comprising the plurality of host computers is in data communication with an ISP, where the ISP is in data communication with the router.

* * * * *